UNITED STATES PATENT OFFICE.

JOHN A. MOFFITT, OF ARLINGTON, MASSACHUSETTS.

CARBON ELECTRODE FOR ELECTRIC LIGHTS.

SPECIFICATION forming part of Letters Patent No. 281,285, dated July 17, 1883.

Application filed March 5, 1883. (No specimens.)

*To all whom it may concern:*

Be it known that I, JOHN AUGUSTUS MOFFITT, of Arlington, in the county of Middlesex, of the Commonwealth of Massachusetts, have invented a new and useful Improvement in the Manufacture of Carbon Electrodes or Pencils for Electrical Illumination; and I do hereby declare the same to be described in the following specification.

The object of my invention is to increase the durability of the carbon pencil or film or conductor under the action of the electrical current; and I accomplish this by mixing with the carbon of which the film, conductor, or pencil may be made, whether such carbon be lamp-black, ivory-black, gas-retort, or other suitable kind of carbon, in a highly-reduced state, or in form of an impalpable powder, a quantity of the substance known by name of "infusorial earth, or diatomaceæ," in a pulverized, or powdered, ground, or properly-reduced state. The powdered carbon and infusorial earth, or diatomaceæ, I thoroughly mix together with water or a suitable binding-vehicle, which may be a saccharine or gelatinous solution. In some cases an alcoholic or other suitable solution of shellac may be used for binding the carbon and infusorial earth.

In preparing the composition I take equal or about equal quantities of the powdered materials and thoroughly mix them together, with a quantity of the binding-vehicle sufficient to bring the whole to a pasty or molding condition, after which I reduce the mass, by molding or otherwise, to the necessary form or forms for use in electric lighting, whether for producing "incandescent" or "arc" light.

I do not confine my invention or composition to the precise proportions of ingredients as above given, as the quantities of them may be varied and still be productive of useful results.

The electrodes or carbon candles, after having been so molded or formed, are to be dried or be suffered to dry, when they will be fit for use in electric lamps for the production of light generated by the resistance of the carbon electrodes, candles, or pencils to a current of electricity when passing through them.

I am aware that silica has been combined or mixed with carbon in the making of electrodes, and therefore I do not claim such.

What I claim as my invention, or a new or improved manufacture, is—

An electrode or electric-light conductor or carbon pencil or candle composed of carbon, infusorial earth, or diatomaceæ, and a binding-vehicle mixed or combined and desiccated, as described.

JOHN AUGUSTUS MOFFITT.

Witnesses:
R. H. EDDY,
E. B. PRATT.